Sept. 25, 1945. C. E. SKELTON 2,385,735
MILLING HEAD ATTACHMENT FOR METALWORKING MACHINES
Filed April 24, 1943 2 Sheets-Sheet 1

INVENTOR.
Charles E. Skelton
BY

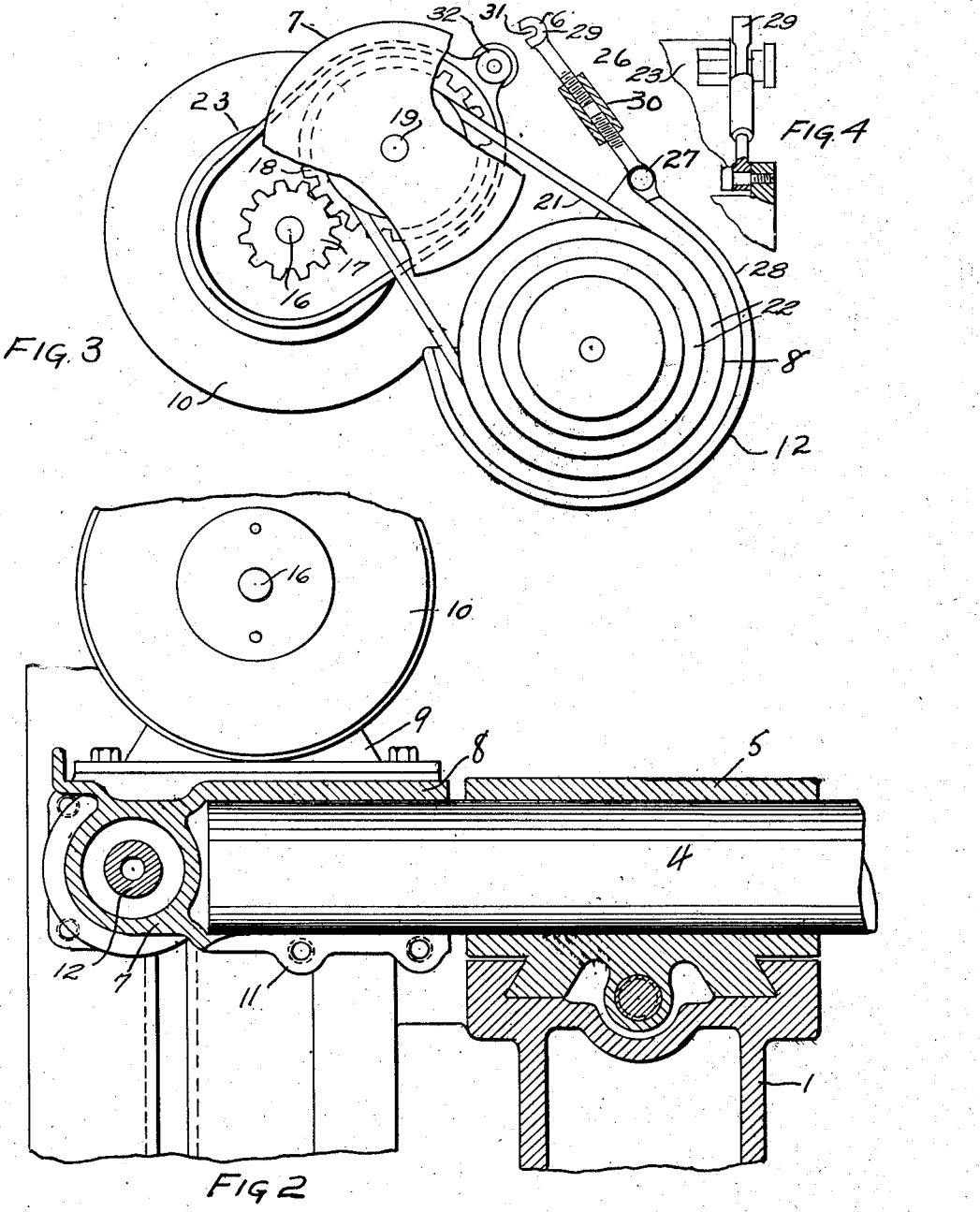

Patented Sept. 25, 1945

2,385,735

UNITED STATES PATENT OFFICE 2,385,735

MILLING HEAD ATTACHMENT FOR METAL-WORKING MACHINES

Charles E. Skelton, Syracuse, N. Y.

Application April 24, 1943, Serial No. 484,380

2 Claims. (Cl. 90—17)

This invention has for its object a milling head attachment for metal working machines, as shapers, planers, profiling machines, etc. having a traveling table and particularly milling machines.

The invention particularly has for its object such an attachment in which the spindle carrying the tool and the motor for turning the spindle are so mounted relative to each other on the overhanging arm or shaft of the machine as to eliminate or reduce vibration to a minimum.

The invention consists in the novel features and in the combinations and constructions hereinafter set forth and claimed.

In describing this invention, reference is had to the accompanying drawings in which like characters designate corresponding parts in all the views.

Figure 2 is a sectional view taken approximately on the plane of line 2—2, Figure 1, parts being omitted.

Figure 3 is a plan view of parts seen in Figure 1.

Figure 4 is a fragmentary view, partly in section, of parts seen in Figure 3.

Figure 1:
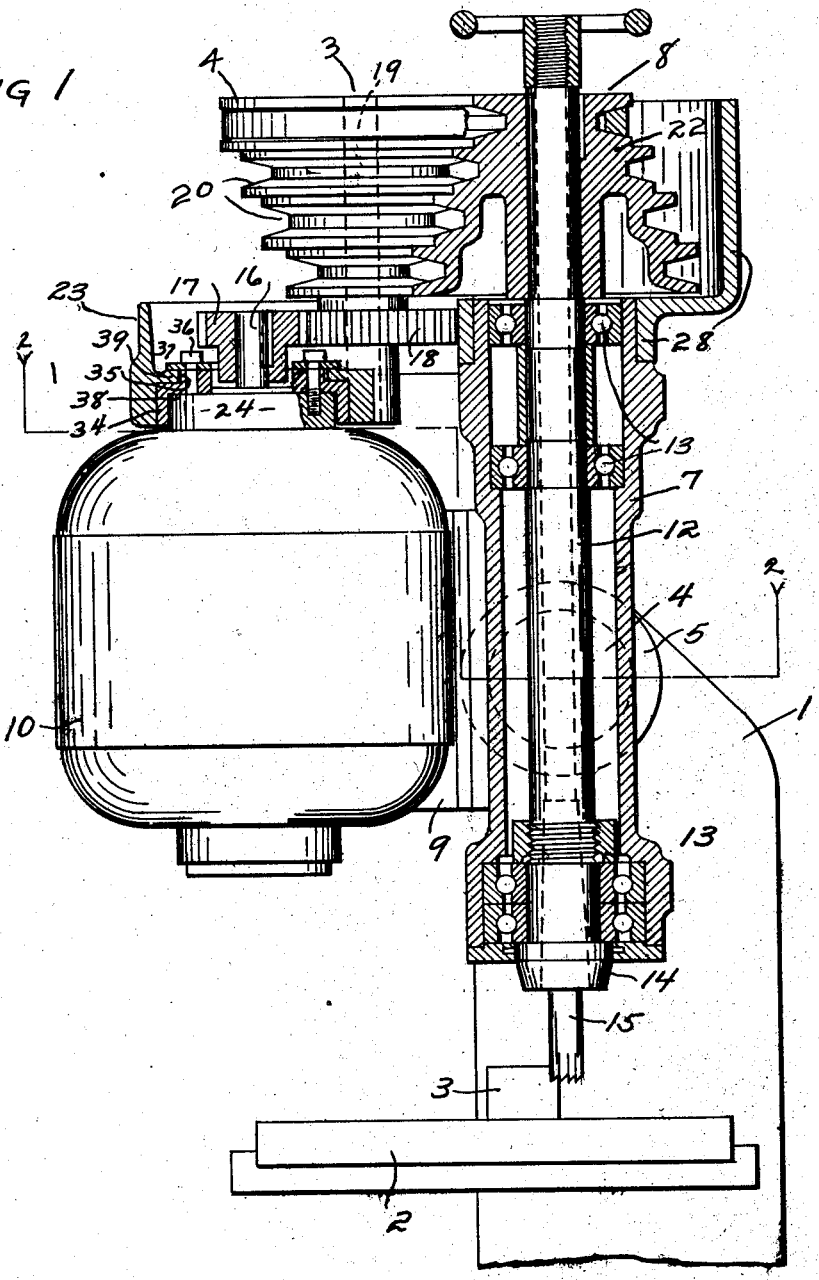
Figure 1 is a vertical sectional view of the attachment, the contiguous portion of the milling machine being also shown.

1 designates a portion of a milling machine; 2 the traveling work table, and 3 the work thereon. 4 designates the overhanging arm of the milling machine. The milling machine construction per se forms no part of this invention. The table 2 may be actuated in any suitable manner and also the overhanging arm 4 is suitably mounted in a carriage 5 to have vertical adjusting movement relative to the table of the milling machine.

The attachment comprises a spindle support as a tube or elongated hub 7 having bearing 8 extending laterally from the hub 7 for mounting on the overhanging arm 4 and a bracket 9 extending laterally at one side of the tubular support 4 and the bearing 8 for carrying a motor 10. The bearing 8 is clamped in any suitable manner on the overhanging arm 4, as by clamping screws 11, which serve to tighten the bearing 8, which is split, on the overhanging arm 4 in any radial position out of the vertical relative to the overhanging arm 4. 12 designates the spindle journalled in suitable bearings, as 13, in the support 7, this spindle extending above the upper end of the support and carrying a chuck 14 at its lower end for holding the tool 15.

The motor is arranged with its shaft 16 parallel to the axis of the spindle 12, that is, vertical when the spindle is vertical. The motion of the shaft is transferred to the spindle through a pinion 17 mounted on the motor shaft, a gear 18 meshing with the pinion and mounted on the shaft 19 having a cone of pulleys 20 thereon and a belt 21 selectively engaged with any one of the pulleys of the cone 20 and with a corresponding pulley of a complemental cone 22 mounted on the upper end of the spindle. The shaft 19 on which the gear 18 is mounted is suitably mounted on a carrier 23 mounted at one end on a hub 24 on a casing of the motor 10 and extending radially therefrom, this carrier 23 having a shifting movement about the axis of the shaft 16 or about the hub 24 to tighten or loosen the belt for the purpose of shifting the belt from one set of pulleys of the cones to another. The carrier is held in its adjusted position by a link 26 pivoted at one end at 27 to the support 4 or a segmental collar 28 mounted on the upper end of the support and at its other end at 29 to the carrier 23, the link consisting of two sections, which are connected together, so as to be extended or shortened by a turnbuckle 30. One end of the link, as the end 29 is formed with a slot 31 for coupling with a clamping screw 32 on the carrier 23. To shift the belt, the screw 32 is loosened and the link 26 uncoupled from the carrier, the belt shifted and the carrier then moved outwardly far enough to tighten the belt satisfactorily, the link is then swung back into coupling engagement with the clamping screw 32 and the screw 32 tightened. The turn-buckle is used for the purpose of adjusting the belt to the proper tension.

As here shown, the carrier 23 is adapted to the hub 24 of the motor by an adapter ring 34 enclosing the hub 24 and having an inturned flange 35 lapping the outer end of the hub 24. This flange is secured to the hub 24 as by clamping screws 36. The clamping screws also extend through an annular plate 37 overlying the flange 35 and overhanging the same forming an annular groove at 38 for receiving an annular internal flange 39 on the carrier. During the shifting of the carrier 23 about the axis of the motor shaft 16, the flange 39 works in the groove 38.

This adapter is a convenient means for adjustably mounting the gear carrier 23 on the hub of the motor.

Owing to the relative arrangement of the spindle or the support and the motor, that is, with the motor at one side of the spindle and the spindle support, there is a minimum of vibration, or in other words, owing to the relative arrangement of the spindle support and the motor to the overhanging arm 4, vibration is reduced to a minimum and the vibration of the tool does not re-act on the motor.

What I claim is:

1. A milling head attachment for metal working machines including a body having a spindle support and means extending laterally from the intermediate portion of the support for attachment to the overhanging arm of the metal working machine, and also a bracket extending laterally from between the ends thereof for supporting a motor, a tool spindle journalled in the support, a motor mounted on the bracket with its shaft parallel to the axis of the spindle, a carrier mounted on the motor casing and having a rocking movement about the axis of the motor shaft, a pinion mounted on the motor shaft within the carrier, a gear meshing with the pinion, and a shaft therefor mounted in the carrier, the spindle extending above the support, pulley and belt means between the last shaft and the upper end of the spindle.

2. A milling head attachment for metal working machines including a body having a spindle support and means extending laterally from the intermediate portion of the support for attachment to the overhanging arm of the metal working machine, and also a bracket extending laterally from between the ends thereof for supporting a motor, a tool spindle journalled in the support, a motor mounted on the bracket with its shaft parallel to the axis of the spindle, a carrier mounted on the motor-casing and having a rocking movement about the axis of the motor shaft, a pinion mounted on the motor shaft within the carrier, a gear meshing with the pinion, and a shaft therefor mounted in the carrier, the spindle extending above the support, pulley and belt means between the last shaft and the upper end of the spindle, and adjustable means for holding the carrier from pivotal shifting movement about the axis of the motor shaft.

CHARLES E. SKELTON.